United States Patent [19]

Kamiya

[11] 4,267,872
[45] May 19, 1981

[54] VEHICLE TIRE WITH TREAD HAVING CIRCUMFERENTIALLY VARYING RIGIDITY

[75] Inventor: Tadashi Kamiya, Niiza, Japan

[73] Assignee: Honda Giken Kogyo Kabushiki Kaisha, Tokyo, Japan

[21] Appl. No.: 31,434

[22] Filed: Apr. 19, 1979

[30] Foreign Application Priority Data

Apr. 20, 1978 [JP] Japan ................................ 53-47092
Apr. 21, 1978 [JP] Japan ................................ 53-47526
Apr. 21, 1978 [JP] Japan ............................ 53-53037[U]

[51] Int. Cl.³ ........................ B60C 11/06; B60C 11/14
[52] U.S. Cl. ................................ 152/209 D; 152/210; 152/209 R
[58] Field of Search ....... 152/209 R, 209 A, 210-212, 152/209 B, 209 NT, 209 WT, 209 D, 354 R, 343-345

[56] References Cited

U.S. PATENT DOCUMENTS

| | | | |
|---|---|---|---|
| 1,449,582 | 3/1923 | Brown | 152/209 R |
| 2,068,050 | 1/1937 | Bishop | 152/209 R |
| 3,004,578 | 10/1961 | Braudorn | 152/209 B |
| 3,861,436 | 1/1975 | Poque | 152/209 R |
| 3,951,191 | 4/1976 | Suzuki et al. | 152/209 R |

Primary Examiner—John T. Goolkasian
Assistant Examiner—Lois E. Boland
Attorney, Agent, or Firm—Irving M. Weiner; Pamela S. Burt; John L. Shortley

[57] ABSTRACT

A vehicle tire having first areas of a higher degree of rigidity and second areas of a lower degree of rigidity, the first and second areas having different degrees of radially inward recession upon contact of the tire with the ground and being alternately arranged in the circumferential direction of the tire. Each of the second areas comprises a central projection and a plurality of projections surrounding the central projection in spaced relation and spaced from each other. Some of the projections which are located at the tread edges have side surfaces extending substantially parallel to a radial plane through the tire. The outermost projections disposed adjacent to the projections at the tread edges have side surfaces facing the ground and extending substantially perpendicularly relative to the side surfaces of the projections at the tread edges. With this arrangement, the tire can be driven with an increased degree of driving force on rough ground or terrain, such as sand and/or gravel.

6 Claims, 20 Drawing Figures

VEHICLE TIRE WITH TREAD HAVING CIRCUMFERENTIALLY VARYING RIGIDITY

BACKGROUND OF THE INVENTION

1. Field of the Invention

The present invention relates to a vehicle tire suitable for use on rough ground or terrain. More particularly, the invention relates to a vehicle tire having alternately arranged high-rigidity and low-rigidity areas with different degrees of radially-inward recession upon contact of the tire with the ground, so as to provide an increased degree of driving force on rough ground.

2. Description of the Art

Off-road vehicle tires adapted for driving on rough ground or terrain, such as gravel, sand, and other uneven surfaces, should have a specially designed tread so as to be comparable with tires to be used on paved roads with regard to driveability.

Figures 14, 15, 16, 17:
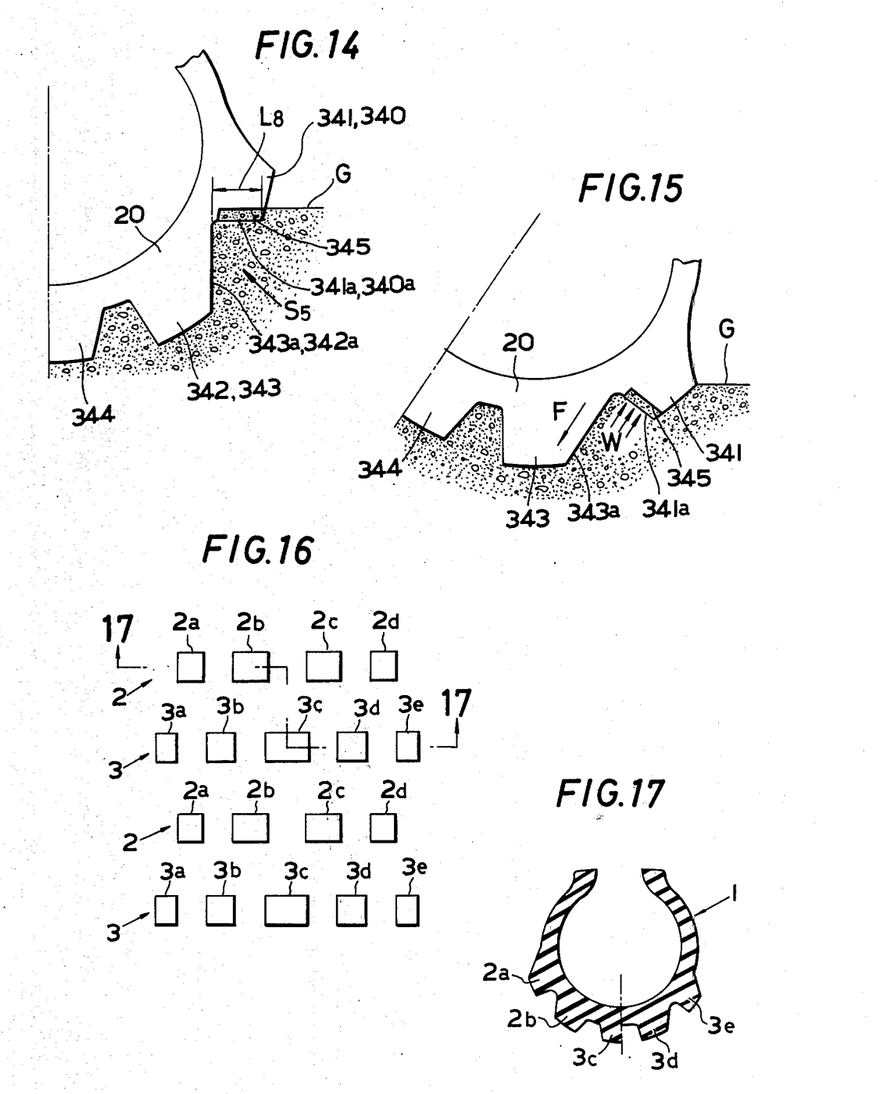
FIGS. 14 and 15 are views illustrating the way in which the tire of FIG. 10 acts during use.
FIG. 16 is a developed view of part of a tread pattern of a conventional pneumatic tire for use on rough ground.
FIG. 17 is a cross-sectional view taken along line 17—17 of FIG. 16.

In FIG. 16 of the accompanying drawings there is shown a developed view of the tread pattern of a conventional tire 1 for use on rough ground. The cross-section of such tire 1 is shown in FIG. 17, as viewed vertically with the tire in an upright position. The tire 1 has a plurality of groups 2 of four projections $2a$, $2b$, $2c$ and $2d$ aligned with each other in the transverse or widthwise direction of the tire 1, and a plurality of groups 3 of five projections $3a$, $3b$, $3c$, $3d$ and $3e$ aligned transversely with each other and spaced from the adjacent groups 2 in the circumferential direction of tire 1. The groups 2 and 3 are alternately arranged in the circumferential direction. With such arrangement, it is intended that as the tire 1 rotates the projections $2a$ through $2d$, and $3a$ through $3e$ penetrate the gravel or the like of the rough ground, thereby producing driving forces for the tire.

On the other hand, it is desired, and has been proposed, that the tire be shaped so as to have a polygonal configuration with areas of larger and smaller radii upon contact with the ground. With such a structure, driving forces are transmitted when the sides of the polygonal tires contact the ground, and the tire is lifted when the corners of the polygonal tire act on the ground, whereby the vehicle can travel reliably on rough ground.

The conventional tire 1 above described, having the projection groups 2 and 3 alternately arranged circumferentially, has different degrees of rigidity because of the difference in the number of projections and the spacing between them. Although areas of a lower degree of rigidity become recessed radially inwardly to form a polygonal shape when the tire contacts the ground, the difference in rigidity between the projection groups is extremely small because the projections in each group are formed and disposed independently of each other. The projection groups 2 and 3 are provided at the tire tread, and the number of corners on the polygonal tire is extremely large, normally forty to fifty. Therefore, the tire rotates substantially in a circular shape, with the result that the aforesaid proposal is practically impossible to achieve. This result arises from the fact that the projections on the tire 1 of conventional design are provided for penetration into the ground with no concern for the above proposal for reliable travel on rough ground.

Figure 18:
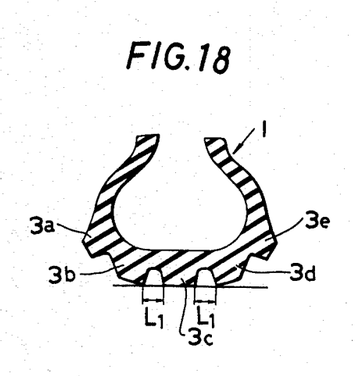
FIGS. 18 through 20 are views illustrating problems with a conventional pneumatic tire.
Figure 19:
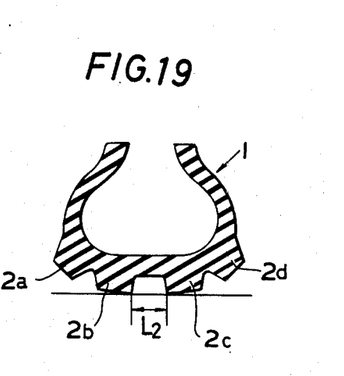

As shown in FIG. 18, because the projections $3b$, $3d$ are located adjacent to and on each side of central projection $3c$, the distances $L_1$, $L_1$, respectively, between the projections $3b$, $3c$ and between the projections $3c$, $3d$ change only slightly even if the tire contacts the ground. When the tire 1 rotates on rough ground, the gravel or other upper layer of ground does not collect toward the central projection $3c$, but is displaced alongside the tire. When, on the other hand, the groups 2 contact the ground as illustrated in FIG. 19, the weight of the vehicle is borne by the centrally located projections $2b$, $2c$. Although the distance $L_2$ between the projections $2b$, $2c$ is larger than the distance $L_1$, the distance $L_2$ does not change greatly either, with the result that the gravel or the like is shifted alongside the tire rather than centrally gathered.

Figure 20:
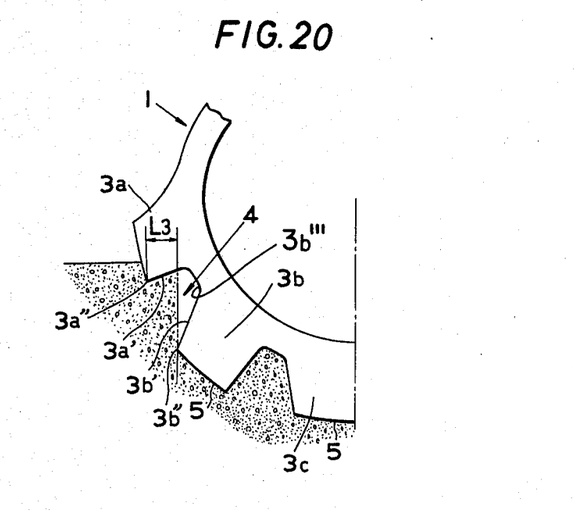

The second projection $3b$ counting from the outermost projection $3a$ in the group 3 has an outer surface $3b'$ which does not extend vertically (FIG. 20) and has its upper edge $3b'''$ recessed inwardly widthwise of the tire to a greater extent than its lower edge $3b''$. Thus, between the outermost projection $3a$ and the next projection $3b$, there is formed a space 4 into which no gravel or sand enters while the tire contacts the ground as the vehicle runs thereon. Accordingly, the distance $L_3$ over which the gravel or sand is held in contact with the inner surface $3a'$ of the outermost projection $3a$ substantially corresponds to the lateral distance between the edge $3a''$ of the projection $3a$ and the edge $3b''$ of the projection $3b$. The surface $3a'$ does not contact the gravel or sand over its entire width, and hence cannot function to stiffen the ground material, leaving insufficient reactive forces available for driving the tire. Therefore, there is a limitation on driving forces produced between the conventional tire 1 and the ground, and at times the tire 1 tends to slip under bad ground conditions. On cornering, when the vehicle changes its running direction, the edge $3a''$ of the outermost projection $3a$ only functions to prevent sidewise slipping, and driving and accelerating forces are provided by the surfaces 5 of the projections $3a$ through $3c$, with the inner surface $3a'$ of the projection $3a$ failing to effectively serve such purpose during cornering. Thus, the surface $3a'$ of the projection $3a$ fails to gain an increased degree of driving force.

The present invention provides a pneumatic vehicle tire for use on rough ground or terrain, such as in sand and/or gravel, which eliminates the foregoing problems associated with conventional vehicle tires.

SUMMARY OF THE INVENTION

The present invention provides a vehicle tire which includes a tread portion having a plurality of projections on the surface thereof. Also included are sidewall portions, and shoulder portions extending between the tread portion and the sidewall portions. Bead portions are provided for fitting the tire to a wheel rim. The tread portion includes a plurality of first areas and a plurality of second areas of projections. The first areas have substantially high rigidity relative to the second areas, and are adapted to yield by a relatively small degree radially inwardly of said tire when the first areas come into contact with a ground surface. The second areas have a substantially low rigidity relative to the first areas and are adapted to yield by a relatively large degree radially inwardly of the tire when the second areas come into contact with a ground surface. The first and second areas of the tread portion are alternately arranged in the circumferential direction of the tire.

An object of the present invention is to provide a vehicle tire for use on rough ground or terrain, the tire having areas of a lower degree of rigidity which yield a relatively large degree radially inwardly of the tire when the latter contact the ground, and areas of a higher degree of rigidity which yield a relatively small degree radially inwardly when the tire contacts the ground. The lower-rigidity and higher-rigidity areas are alternately arranged in the circumferential direction of the tire. When such areas contact the ground surface, the lower portion of the tire yields to become polygonally-shaped, with the high-rigidity areas acting as the corners or angles of the polygonal shape. While the vehicle is running, the side elevational shape of the lower portion of the tire becomes polygonal, and there is produced a force tending to raise the tire because of the difference in radius between the higher-rigidity and lower-rigidity areas. Accordingly, the tire can act effectively on the ground surface as the tire corners bear thereagainst, with the result that the vehicle can be reliably driven, even on a gravel surface, with sufficient driving forces.

Another object of the present invention is to provide an off-road tire wherein the lower-rigidity areas are formed by a first projection located centrally in a sufficiently large space and a plurality of second projections disposed at the corners of such space. Thus, there is provided a central portion of a lower degree of rigidity which yields when contacting the ground surface, thereby gathering gravel or sand and pressing it, to harden the ground surface under the tire.

The second projections surround the first projection, and four of such second projections are provided, disposed on diagonal lines crossing together at the first projection. The second projections are disposed at the corners of the square-shaped space to define the lower-rigidity central portion of the space. Thus, such central portion of the space yields radially of the tire, for collecting gravel and earth therein upon contact with the ground.

When the first projection contacts the ground and is recessed radially inwardly, the space surrounded by the second projections is also recessed radially inwardly under the weight of the vehicle, whereupon the second projections are displaced into the space to thereby compress gravel and other ground surface material therein. The ground surface is thus hardened by such compression and further by the weight of the vehicle itself, resulting in good driveability on the rough ground or terrain and in an increased amount of driving force.

Still another object of the present invention is to provide a tire for use on rough ground or terrain in which some of the projections located at the edges of the tire tread have outer surfaces extending substantially parallel to a radial plane through the tire, and the outermost projections disposed adjacent to such projections on the tread edge have surfaces facing the ground and extending substantially perpendicularly to the outer surfaces of the projections. As the tire tread contacts the terrain (sand or gravel, etc.), the outer surfaces of the projections, being substantially parallel to the radial plane through the tire, do not afford any space into which gravel or sand can enter. Therefore, the gravel or sand is held in contact fully with the surfaces of the outermost projections which face the ground. Thus, the tire according to the invention has a greater area of contact with the ground than that of conventional tires for an increased amount of driving force. In addition, such surfaces of the outermost projections can increase driving and accelerating forces during cornering of the vehicle.

The above and other objects and advantages of the present invention will become apparent from the following detailed description taken in conjunction with the accompanying drawings which illustrate exemplary preferred embodiments of the invention.

DETAILED DESCRIPTION OF PREFERRED EMBODIMENTS

Figure 1:
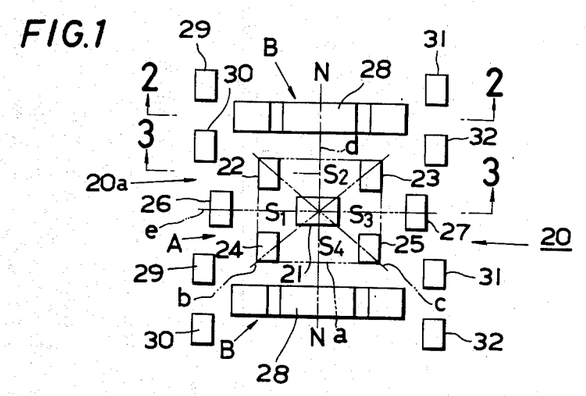
FIG. 1 is a developed view of part of a tread pattern of a pneumatic tire constructed in accordance with the invention.

FIG. 1 is a developed view of part of a tread pattern, illustrative of the principles of a pneumatic tire 20 constructed in accordance with the invention for use on rough, off-road ground or terrain, the view as seen vertically showing the tire 20 in an upright position.

Figure 2:
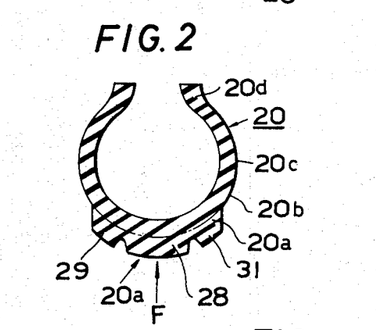
FIG. 2 is a cross-sectional view taken along line 2—2 of FIG. 1.
Figure 3:
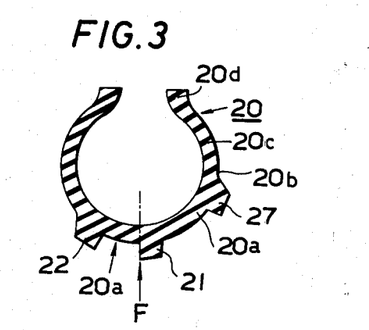
FIG. 3 is a cross-sectional view taken along line 3—3 of FIG. 1.

With reference to FIGS. 1-3, tire 20 comprises a tread 20a, shoulders 20b, sidewalls 20c and beaded edges 20d for fitting tire 20 to wheel rims. The tread 20a includes a multiplicity of radially outward projections disposed symmetrically with respect to the central line N—N of the tire. The projections include a central projection 21 surrounded by four block-shaped projections 22, 23, 24 and 25 arranged independently of each other in the pattern of a square a. The projections 22 through 25 are positioned on two diagonal lines b, c crossing each other at the central projection 21. The outer projections 22 through 25 are held out of alignment with the circumferential line d and axial line e, the lines d, e passing through the central projection 21. The central projection 21 is offset from the outer projections 22-25 both circumferentially and axially. A projection 26 is spaced from projections 22, 24 and is located remotely from central projection 21, and a projection 27 is spaced from projections 23, 25 and is located remotely from central projection 21. The projections 26, 27 are arranged on line e and are in line with central projection 21.

The central projection 21 is spaced substantially from outermost projections 26, 27, and is also spaced from outer projections 22-25, so that there are provided relatively large spaces $S_1$ through $S_4$ between projections 21 through 27. The projections 21 through 27 are scattered relatively sparsely in the area A in which the spaces $S_1$ through $S_4$ are defined. Thus, the area A has a lower degree of rigidity than the average overall rigidity of tire 20, whereby the area A is adapted to be recessed radially inwardly when central projection 21 contacts the ground.

A block-shaped elongated projection 28 extends axially or widthwise of the tire, is located at one circumferential side of area A, and acts as a rib. The projection 28 has a length larger than that of an axial side of square a defined jointly by outer projections 22-25. Disposed adjacent to both ends of elongated projection 28 are two pairs of projections 29, 30 and 31, 32 which are offset from projection 28 in the circumferential direction. An area B, wherein the projections 28 through 32 are disposed, having elongated projection 28 extending transversely and centrally therethrough a sufficient length, has a larger volume than that defined by any of projections 21 through 27. Accordingly, the area B has a higher degree of rigidity than the overall rigidity of tire 20.

Another higher-rigidity area B with another similar projection 28 is provided on the other side of lower-rigidity area A, such area B also including projections 29 through 32. A plurality of such areas B are circumferentially spaced at uniform intervals, and a plurality of lower-rigidity areas A are located between areas B at equally spaced intervals. Therefore, the lower-rigidity areas A patterned with projections 21 through 27 alternate between the higher-rigidity areas B patterned with projections 28 through 32, along the circumferential tread 20a of tire 20. The higher-rigidity areas B, which can be deformed as described in detail hereinbelow, serve as the corners of tire 20 to define a polygon. The number of corners is preferably in the range of 3 to 20, depending on the diameter of the wheels of the vehicle. For example, the front-wheel tire of a motorcycle may have fourteen such corners, whereas the rear-wheel tire thereof may have nine corners. The rear wheel tire, having fewer corners, can attain a greater degree of driving force.

When the lower-rigidity area A contacts the ground with a force F acting on the central projection 21 as shown in FIG. 3, the projection 21 becomes recessed radially inwardly and the spaces $S_1$ through $S_4$ also become recessed radially inwardly, whereupon all the outer projections 22 through 25 forming the square a are caused to come into contact with the ground. As the wheel continues to rotate, the elongated projection 28 of higher rigidity contacts the ground and the force F acts on projection 28 as shown in FIG. 2. However, the elongated projection 28 with the sufficient axial length and volume is not subject to radially inward deformation, and area B is deformed less than area A. Because the areas A and B alternately contact the ground, the diameter of tire 20 changes so that tire 20 will be deformed into a polygon, with the higher-rigidity areas B acting as the corners and the lower-rigidity areas A as the sides. With the lower-rigidity areas A held in contact with the ground as the polygon sides, the tire 20 has greater reactability against the ground, to provide enhanced driving forces. When the higher-rigidity areas B, acting as the polygon corners, contact the ground, forces act on the areas B, tending to lift the vehicle, with the result that the reactive force with the ground surface will be increased. The vehicle is thus propelled by the higher-rigidity areas B. Because the lower-rigidity areas A and the higher-rigidity areas B alternately contact the ground, the tire can produce effective driving force even on off-road ground surfaces having sand and gravel thereon.

The tire 20 according to the invention can effectively bite soft ground such as gravel, an effect which, combined with the above-described tread pattern action, adds to greater driving forces.

While a specific embodiment has been described hereinabove, it will be understood that the overall concept is that the areas A and B of different degrees of rigidity are alternately arranged, with the following modifications being possible.

Figure 4:
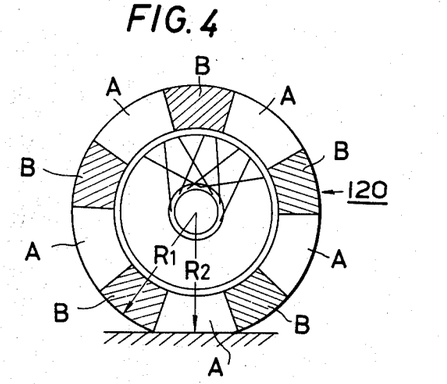
FIG. 4 is a side elevational view illustrative of the manner in which a pneumatic tire according to another embodiment is deformed.

As shown in FIG. 4, areas B of higher rigidity are formed by embedding cord members locally in tire 20. The tire 20 thus includes higher-rigidity areas B and lower-rigidity areas A with no cord members therein, the tire 20 having a diameter $R_1$ at the area B and a different diameter $R_2$ at the area A. The tire 20 can now be deformed into a polygonal shape.

Although in the preceding embodiment the higher-rigidity area B is formed by the elongated projection 28, the area B may comprise a plurality of closely arranged projections which are brought together when a force from the ground acts thereon. The area B may be constructed by making the grooves between the projections more shallow. Further, the tire 20 may have thick-walled portions acting as higher-rigidity areas B and thin-walled portions acting as lower-rigidity areas A, the structures of areas A and B thus being arbitrary.

Figure 5:
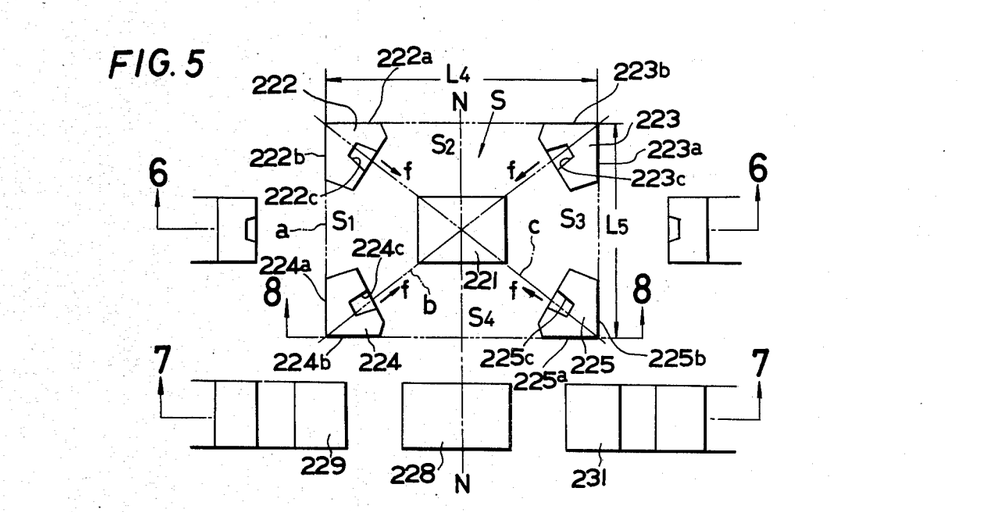
FIG. 5 is an enlarged developed view of part of a tread pattern of the pneumatic tire of FIG. 4.
Figures 6, 7:
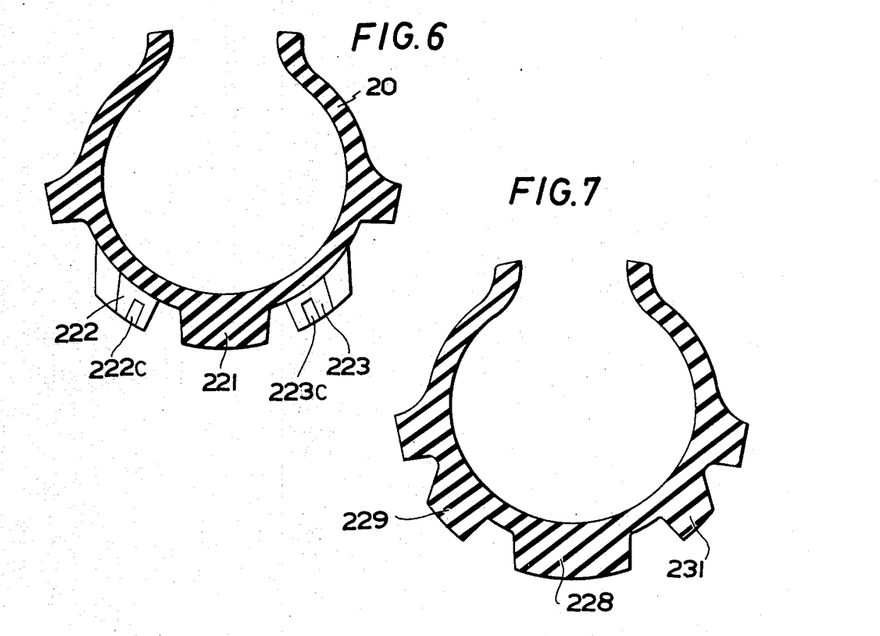
FIG. 6 is a cross-sectional view taken along line 6—6 of FIG. 5.
FIG. 7 is a cross-sectional view taken along line 7—7 of FIG. 5.

FIG. 5 shows a developed tread pattern according to another embodiment of a lower-rigidity area A, the view being taken vertically with the tire in an upright position.

A central projection 221 disposed on a central line N—N of a pneumatic tire is surrounded by four projections 222, 223, 224 and 225 spaced from each other and located on a pair of diagonal lines b, c crossing each other at the central projections 221. The outer projections 222 through 225 are positioned equidistantly from central projections 221. Each of the outer projections 222 through 225 is substantially in the form of a pentagon, with the sides 222a, 222b, 223a, 223b, 224a, 224b, 225a and 225b thereof extending perpendicularly relative to each other to form a square a, in which the central projection 221 is disposed. The central projection 221 is sufficiently spaced from each of the outer projections 222 through 225, and the projections 222 through 225 are sufficiently spaced from one another, to thereby provide a relatively large space S in the square a, the space S comprising spaces $S_1$ through $S_4$. In the illustrated embodiment, projections 228, 229 and 231, located circumferentially adjacent to projections 221 through 225, are axially aligned with each other. The outer projections 222 through 225 are circumferentially offset from the central projection 221. A central area of space S, which surrounds central projection 221, has a reduced degree of rigidity, thereby allowing the central projection 221 to be recessed radially inwardly of the tire. Thus, when subjected to forces, the space S yields inwardly, with the outer projections 222 through 225 being displaced toward the central projection 221.

The square a has an axial length $L_4$ which is equal to or larger than the length $L_5$ in the circumferential direction of the tire. The outer projections 22 through 225 have cavities 222c through 225c provided in the confronting sides thereof, respectively, which add to the yieldability of space S. The cavities 222c through 225c also act to collect gravel centrally in the space S, and to reduce the weight of the tire.

Figure 8:
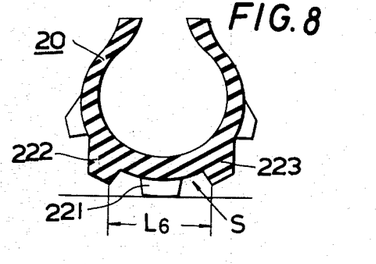
FIGS. 8 and 9 are cross-sectional views taken along line 8—8 of FIG. 5 showing the way in which the tire acts during use.
Figure 9:
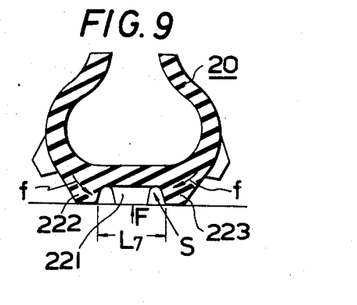

With such an arrangement, when the central projection 221 is out of contact with the ground and thus is not subjected to forces, the projections 222 and 223, one on each side of central projection 221, are spaced at a distance $L_6$, as shown in FIG. 8. When the weight of the vehicle acts on the tire and the wheel rotates to cause the central projection 221 to contact the ground as shown in FIG. 9, a reactive force F from the ground pushes the central projection 221 radially inwardly. The space S with outer projections 222 through 225 therein thus yields radially inwardly due to lower-rigidity and the outer projections 222 through 225 are displaced in the direction of the arrows f in FIG. 5. The distance between the projections 222 through 225 is then reduced from $L_6$ to $L_7$ (FIGS. 8 and 9), resulting in a reduction in the volume of space S bounded by the four projections 222 through 225. The gravel in space S is accordingly moved by the outer projections 222 through 225 toward the central projection 221 so as to be compressed. Thus, the surface of the rough ground or terrain becomes solidified. Further, gravel in the space surrounded by projections 221, 224, 225 and 228 (FIG. 5) is similarly compressed. The surface of the ground is subjected to the weight of the tire, which also promotes solidification of the ground surface. With such solidified ground, the vehicle can be driven in a stable manner with an increased driving force. Upon the recessive motion of central projection 221 in the radially inward direction, the projections 221 through 225 jointly forming the square a are all held in contact with the ground, with uniform distribution of pressure over an area to allow an increased degree of reactability of the tire against the ground.

While in the illustrated embodiment the four projections are disposed around the central projection, the number of such outer projections is substantially arbitrary and may be three or five, located at the corners of the polygonal space with the central projection therein, for the same results as mentioned above.

Figure 10:
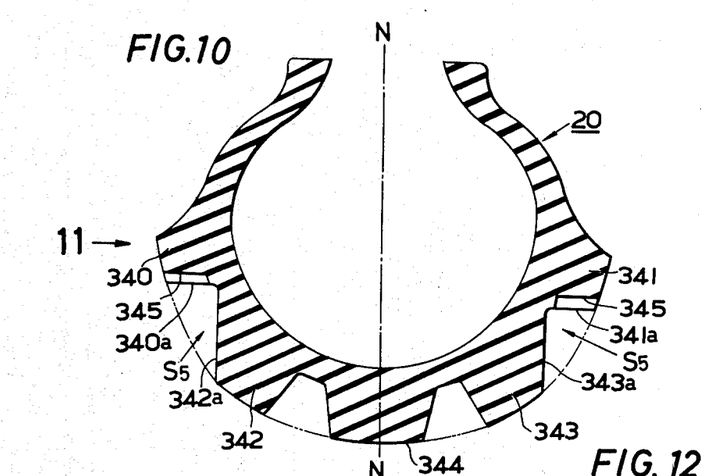
FIG. 10 is a cross-sectional view of a pneumatic tire in accordance with an additional embodiment.

FIG. 10 shows still another embodiment of the invention, designed for providing a greater driving force.

Figure 11:
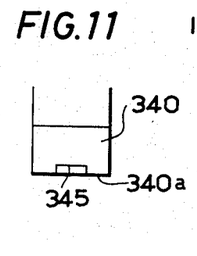
FIG. 11 is a view as seen in the direction of arrow 11 in FIG. 10.
Figure 12:
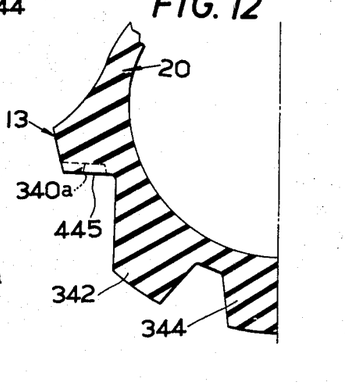
FIG. 12 is a fragmentary cross-sectional view of a pneumatic tire according to still another embodiment.
Figure 13:
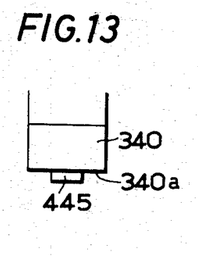
FIG. 13 is a view taken in the direction of arrow 13 in FIG. 12.

A tire 20 is provided with a pair of projections 340, 341 disposed on both sides of the tire and located adjacent to the shoulders, the projections 340, 341 being positioned at opposite edges of the tread. Between the projections 340, 341, are disposed projections 342, 343, 344 spaced from each other in the axial direction. The projections 342, 343 which are located adjacent to projections 340, 341, respectively, have vertical side surfaces 342a, 343a, respectively, which extend substantially parallel to the central line N—N, or a radial plane through the tire. The outermost projections 340, 341 have side surfaces 340a, 341a facing the ground and extending substantially perpendicular to the surfaces 342a, 343a, i.e., extending substantially horizontally. The surfaces 340a, 341a each have a longitudinal groove 345 (FIGS. 10, 11) for effectively gripping sand and gravel to increase driving forces. Instead of the grooves 345, the surfaces 340a, 341a of the projections 340, 341 may have protrusions 445 thereon (FIGS. 12, 13).

With such an arrangement, when the tire is running on a ground surface which is covered with sand and/or gravel, as clearly shown in FIG. 14, the projections 342, 343 and 344 penetrate the sand and gravel G. Because the surfaces 342a, 343a of projections 342, 343 are vertical, there is provided a space $S_5$ (FIG. 10) accommodating therein the sand and gravel which is held in contact with the surfaces 340a, 341a of the outermost projections 340, 341. Accordingly, the driving force from the revolving tire is transmitted to the ground through the surfaces 340a, 341a, grooves 345, or protrusions 345 of the projection 340, 341. Each of the surfaces 340a, 341a acts as an effective contact area over its length $L_8$ (FIG. 14), resulting in an increase in driving force.

On cornering, the tire 20 becomes inclined with respect to the vertical direction as shown in FIG. 15, whereupon the tire tread is subjected to a force comprising the vehicle weight and the centrifugal force, resulting in a reactive force W acting from the ground on the tire. The force W acts on the surface 341a perpendicularly, and surface 341a functions as an effective contact area with which the sand and gravel engages over its full length $L_8$ for increased driving and accelerating forces.

Although the vertical outer side surfaces 342a, 343a extend in a radial plane through the tire in the illustrated embodiment, such outer surfaces may be located on projections disposed at any selected locations on the tire, and there may be as many such outer surfaces as there are projections extending axially of the tire. Where the vertical surfaces 342a, 343a are provided on projections 342, 343 and the horizontal surfaces 340a, 341a are provided on projections 340, 341, the outer side surfaces 342a, 343a should preferably become substantially parallel to the radial plane through the tire and the inner side surfaces 340a, 341a, should preferably become substantially perpendicular to the outer side surfaces 342a, 343a when the tire is deformed under the weight of the vehicle.

Although there have been described what are at present considered to be the preferred embodiments of the invention, it will be understood that various modifications may be made therein without departing from the spirit or essential characteristics thereof. The present embodiments are therefore to be considered in all respects as illustrative, and not restrictive. The scope of the invention is indicated by the appended claims rather than by the foregoing description.

I claim:

1. A vehicle tire comprising:
   a tread portion having a plurality of projections on the surface thereof;
   sidewall portions;
   shoulder portions extending between said tread portion and said sidewall portions;
   bead portions for fitting said tire to a wheel rim;
   said tread portion including a plurality of first areas and a plurality of second areas;
   said first areas having substantially high rigidity relative to said second areas and being adapted to yield by a relatively small degree radially inwardly of said tire when said first areas come into contact with a ground surface;

said second areas having a substantially low rigidity relative to said first areas and being adapted to yield by a relatively large degree radially inwardly of said tire when said second areas come into contact with a ground surface;

said first and second areas of said tread portion being alternately arranged in the circumferential direction of said tire;

said first areas each including a substantially elongated projection having the length thereof extending in the widthwise direction of said tire;

said second areas of said tread portion including a plurality of projections arranged substantially sparsely relative to said elongated projections in said first areas, so as to define relatively large spaces between said sparsely arranged projections of said second areas;

said elongated projection of said first areas having a relatively greater volume than the volume of said projections of said second areas;

first ones of said plurality of projections including outer surfaces facing widthwise of said tire and extending substantially parallel to a radial plane of said tire; and second ones of said plurality of projections located outwardly widthwise of said first projections being provided with inner surfaces extending substantially perpendicular to said outer surfaces of said first ones of said projections.

2. A vehicle tire according to claim 1, wherein:

said first ones of said projections having said outer surfaces are disposed adjacent to and inwardly of projections which are disposed outermost widthwise of said tire; and said outermost projections are provided with inner surfaces extending substantially perpendicular to said outer surfaces.

3. A vehicle tire comprising:

a tread portion having a plurality of projections on the surface thereof;

sidewall portions;

shoulder portions extending between said tread portion and said sidewall portions;

bead portions for fitting said tire to a wheel rim;

said tread portion including a plurality of first areas and a plurality of second areas;

said first areas having substantially high rigidity relative to said second areas and being adapted to yield by a relatively small degree radially inwardly of said tire when said first areas come into contact with a ground surface;

said second areas having a substantially low rigidity relative to said first areas and being adapted to yield by a relatively large degree radially inwardly of said tire when said second areas come into contact with a ground surface;

said first and second areas of said tread portion being alternately arranged in the circumferential direction of said tire;

said first areas each including a substantially elongated projection having the length thereof extending in the widthwise direction of said tire;

said second areas of said tread portion including a plurality of projections arranged substantially sparsely relative to said elongated projections in said first areas, so as to define relatively large spaces between said sparsely arranged projections of said second areas, said projections in said second areas including:

a central projection disposed substantially centrally widthwise of said tire;

four outer projections spaced from said central projection and from each other, and surrounding said central projection such that a substantial amount of space is provided between said central projection and said outer projections;

said four outer projections being disposed at the corners of a square defined around said central projection, and on diagonal lines which cross at said central projection; and said elongated projection of said first areas having a relatively greater volume than the volume of said projections of said second areas.

4. A vehicle tire according to claim 3, wherein:

said elongated projection of said first areas of said tread portion includes a plurality of projections closely arranged so as to be brought together when a force from the ground acts thereon.

5. A vehicle tire according to claim 3, wherein:

said first areas include a cord member embedded locally in said tire.

6. A vehicle tire according to claim 3, wherein:

said outer projections are provided with cavities in sides thereof which confront said central projection.

* * * * *